United States Patent
Senguttuvan et al.

(10) Patent No.: US 9,331,333 B2
(45) Date of Patent: May 3, 2016

(54) ACTIVE SUBSTANCE FOR ELECTRODE FOR A SODIUM ION BATTERY

(75) Inventors: Premkumar Senguttuvan, Amiens (FR); Rosa Maria Palacin, L'Hospitalet de Llobregat (ES); Jean-Marie Tarascon, Mennecy (FR)

(73) Assignees: AGENCIA ESTALAL CONSEJO SUPERIOR DE INVESTIGACIONES CIENTIFICAS, Madrid (ES); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 274 days.

(21) Appl. No.: 14/129,756

(22) PCT Filed: Jul. 2, 2012

(86) PCT No.: PCT/FR2012/051518
§ 371 (c)(1),
(2), (4) Date: May 23, 2014

(87) PCT Pub. No.: WO2013/004957
PCT Pub. Date: Jan. 10, 2013

(65) Prior Publication Data
US 2015/0295236 A1    Oct. 15, 2015

(30) Foreign Application Priority Data

Jul. 4, 2011   (FR) ...................... 11 56007

(51) Int. Cl.
*H01M 4/485*   (2010.01)
*H01M 10/054*  (2010.01)
(Continued)

(52) U.S. Cl.
CPC ............ *H01M 4/485* (2013.01); *H01M 4/0445* (2013.01); *H01M 4/131* (2013.01);
(Continued)

(58) Field of Classification Search
USPC .......................... 429/231.5, 231.9
See application file for complete search history.

(56) References Cited

U.S. PATENT DOCUMENTS

2009/0253025 A1   10/2009   Whitacre
2010/0266900 A1   10/2010   Makidera et al.

FOREIGN PATENT DOCUMENTS

EP         2216298       8/2010

OTHER PUBLICATIONS

Search Report Dated 2012.
(Continued)

*Primary Examiner* — Tracy Dove
(74) *Attorney, Agent, or Firm* — Sofer & Haroun, LLP

(57) ABSTRACT

The present invention relates to a negative electrode material for a sodium ion battery, and to a method for producing it. The active material of the electrode material is composed of an oxide with a structure corresponding to the layered structure of the compound $Na_2Ti_3O_7$, said oxide conforming to the formula $Na_xTi(IV)_aTi(III)_bM_cO_7$ (A), in which x denotes the number of $Na^+$ ions inserted between the layers, per $Ti_3O_7$ structural unit, with $0<x\leq 5$; Ti(IV) and Ti(III) represent titanium in the oxidation states IV and III, respectively; M represents one or more elements selected from 3d transition metals and 4d transition metals; the values of x, a, b and c are such that the compound is electronically neutral in view of the oxidation state of the element or elements represented by M; and the ratio $(a+b)/c$ is greater than 0.5.
The electrode material is obtained by electrochemical reduction of an oxide $Na_xTi(IV)_a'M_cO_7$(B).

15 Claims, 6 Drawing Sheets

(51) Int. Cl.
| | |
|---|---|
| H01M 4/04 | (2006.01) |
| H01M 4/131 | (2010.01) |
| H01M 4/1391 | (2010.01) |
| H01M 4/38 | (2006.01) |
| H01M 4/62 | (2006.01) |
| H01M 10/0565 | (2010.01) |
| H01M 10/0569 | (2010.01) |

(52) U.S. Cl.
CPC ............ H01M4/1391 (2013.01); H01M 4/381 (2013.01); H01M 10/054 (2013.01); H01M 4/622 (2013.01); H01M 10/0565 (2013.01); H01M 10/0569 (2013.01); H01M 2300/0085 (2013.01)

(56) References Cited

OTHER PUBLICATIONS

K. Chiba et al.: "Synthesis, structure and electrochemical Li-ion intercalation properties of Li2Ti3O7 with Na2Ti3O7—type layered structure" Dated 2008.

ACTIVE SUBSTANCE FOR ELECTRODE FOR A SODIUM ION BATTERY

RELATED APPLICATIONS

This application is a National Phase Application of PCT/FR2012/051518, filed on Jul 2, 2012, which in turn claims the benefit of priority from French Patent Application No. 11 56007 filed on Jul 4, 2011, the entirety of which are incorporated herein by reference.

The present invention relates to a negative electrode material for a sodium ion battery, and to a method for producing it.

TECHNOLOGICAL BACKGROUND

Lithium batteries have been the subject of numerous studies, because of their multiple uses and their performance characteristics. Their future, however, is in jeopardy because of the limited natural availability of lithium.

Some of the properties of sodium are similar to those of lithium, and its use as an alternative solution in batteries has been studied.

It is known practice to use sodium in Na/S batteries which operate at high temperature for storage on the megawatt or MW scale. Also known are Na/NiCl$_2$ systems for electric vehicles. These two types of batteries, however, operate only in a high-temperature range (of the order of 270-300 °C.), where they benefit from the high conductivity of β-alumina ceramics.

Other attempts have been made to produce batteries where the negative is electrode is a sodium metal electrode and the positive electrode is a sodium ion insertion material. Examples include liquid-electrolyte batteries in which the positive electrode is composed of TiS$_2$ or a transition metal oxide having a high oxidation potential, such as Na$_x$MO$_2$, for example, M being Mn or Co. Also included are batteries which operate by circulation of sodium ions between a negative electrode, composed of carbon, and a positive electrode, composed of a phosphate of sodium and a transition metal (US-2002-0192553). However, the capacity of batteries which operate by circulation of sodium ions in the electrolyte, with a carbon negative electrode, is unstable over time, and falls rapidly in the course of successive cycles.

The compound Na$_2$Ti$_3$O$_7$, and its capacity for reversible insertion of lithium ions, without detriment to the crystallographic structure, are known [K. Chiba, et al., Solid State Ionics, 178 (2008)1725-1730]. It is noted, however, that the reversible capacity of the Na$_2$Ti$_3$O$_7$ material is significantly lower than that of the lithium-containing material, Li$_2$Ti$_3$O$_7$, having the same structure.

THE PRESENT INVENTION

The objective of the present invention is to provide a battery which operates by circulation of sodium ions in an electrolyte that comprises a sodium salt and that is placed between two electrodes in which the sodium ions can be inserted reversibly.

This objective is achieved by a new active material for a negative electrode, capable of inserting sodium ions reversibly at a potential lower than that of the sodium ion batteries described in the prior art. The improvement in the specific capacity makes the battery of the invention of interest in relation to lithium ion batteries, in the context of low lithium availabilities.

The inventors have found that, surprisingly, the insertion of Na$^+$ ions into a material with a lamellar structure, derived from the oxide Na$_2$Ti$_3$O$_7$, produces a material capable of operating with good performance characteristics as an active material of the negative electrode of a sodium ion battery.

The present invention provides a new active electrode material, an electrode which comprises said active material, a method for producing the electrode, and a sodium ion battery in which the negative electrode is an electrode according to the invention.

The active electrode material according to the invention is an oxide of Na and Ti with a structure corresponding to the layered structure of the compound Na$_2$Ti$_3$O$_7$, said oxide conforming to the formula Na$_x$Ti(IV)$_a$Ti(III)$_b$M$_c$O$_7$ (A), in which:

- x denotes the number of Na$^+$ ions inserted between the layers, per Ti$_3$O$_7$ structural unit, with 0<x≤5;
- Ti(IV) and Ti(III) represent titanium in the oxidation states IV and III, respectively;
- M represents one or more elements selected from 3d transition metals and 4d transition metals;
- the values of x, a, b and c are such that the compound is electronically neutral in view of the oxidation state of the element or elements represented by M;
- the ratio (a+b)/c is greater than 0.5.

The 3d metals include V, Cr and Mn. The 4d metals include Nb and Mo. Very particular preference is given to Nb and V.

In the oxide (A), the electroneutrality corresponds to the following conditions: a+b+c=3, x+4a+3b+mc=14, m being the weighted average of the different oxidation states of the same element M or of the oxidation states of different elements M.

An oxide (A) in which c=0 corresponds, in the partially reduced state, to the formula Na$_x$Ti(IV)$_a$Ti(III)$_b$O$_7$, with 2<x≤5, a+b=3, x+4a+3b=14. In the completely reduced state, it corresponds to the formula Na$_5$Ti(III)$_3$O$_7$.

An oxide (A) in which M is Nb corresponds to the formula Na$_x$Ti(IV)$_a$Ti(III)$_b$Nb$_c$O$_7$, with 0<x<5, a+b+c=3, x+4a+3b+mc=14, m being the weighted average of the oxidation states Nb(V) and Nb(IV). In the completely reduced state, a=0 and the oxide (A) corresponds to the formula Na$_x$Ti(III)$_b$Nb(IV)$_c$O$_7$, with x=14-(3b+4c).

An oxide (A) in which M is V corresponds to the formula Na$_x$Ti(IV)$_a$Ti(III)$_b$V$_c$O$_7$, with 0<x≤5, a+b+c=3, x+4a+3b+mc=14, m being the weighted average of the oxidation states V(V) and V(III). In the completely reduced state, a=0 and the oxide (A) corresponds to the formula Na$_x$Ti(III)$_b$V(III)$_c$O$_7$, with x=14-3(b+c).

An active material composed of an oxide of Na and Ti of the formula (A) according to the invention is denoted hereinafter by NxTMO. Among the oxides NxTMO, Na$_x$Ti(IV)$_a$Ti(III)$_b$O$_7$ is particularly preferred.

An electrode according to the invention is composed of a current collector which carries an electrode material which comprises said active material NxTMO, In one preferred embodiment, the material of the electrode further comprises an electron conductivity agent or a binder, or both.

The electron conductivity agent may be a carbon black, an acetylene black, natural or synthetic graphite, carbon nanotubes, etc.

The binder is preferably a polymer which has a high modulus of elasticity (of the order of several hundred MPa), and which is stable under the temperature and voltage conditions in which the electrode is intended to operate. Examples include fluoropolymers [such as a polyvinyl fluoride) or a poly(tetrafluoroethylene)], carboxymethylcelluloses (CMC), copolymers of ethylene and propylene, or a mixture of at least two of these polymers.

The electrode material preferably comprises:
at least 60% by weight of NxTMO;
from 0% to 30% by weight of electron conductivity agent;
from 0% to 30% by weight of polymeric binder.

When the electrode material comprises a polymeric binder, it is in the form of a film carried by a current collector.

When the electrode material does not comprise binder, it is in the form of a compacted powder layer carried by a current collector.

The current collector is composed of a conductive material, more particularly of a metallic material which may be selected, for example, from copper, aluminium, a steel, and iron.

The electrode material preferably has a thickness between 100 and 300 pin,

In one particularly preferred embodiment, the active material of the electrode is $Na_xTi(IV)_aTi_bO_7$.

The active electrode material $Na_xTi(IV)_aTi(III)_bM_cO_7$ (NxTMO) may be prepared electrochemically, from the precursor oxide with a structure corresponding to the layered structure of the compound $Na_2Ti_3O_7$ and which conforms to the formula $Na_{x'}Ti(IV)_{a'}M_cO_7$(B), in which:

x' denotes the number of $Na^+$ ions inserted between the layers, per $Ti_3O_7$ structural unit, with $0<x'\leq 2$;
Ti(IV) represents titanium in the oxidation state IV;
M represents one or more elements selected from 3d transition metals and 4d transition metals;
a'=a+b;
the values of x', a' and c are such that the compound is electronically neutral in view of the oxidation state of the element or elements represented by M;
the ratio a'/c is greater than 0.5.

In the oxide (B), the electroneutrality corresponds to the following conditions: a'+c=3, x'+4a'+m'c=14, m being the oxidation state of a single element M or the weighted average of the oxidation states of different elements M.

A precursor oxide (B) in which c=0 corresponds to $Na_2Ti(IV)_aO_7$. A precursor oxide (B) in which M is Nb corresponds to the formula $Na_{x'}Ti(IV)_{a'}Nb_cO_7$, with $0<x'\leq 2$, a'+c=3, x'+4a'+5c=14, the oxidation state of Nb being V. A precursor oxide (B) in which M is V corresponds to the formula $Na_2Ti(IV)_{3-c}V_cO_7$, with x'+4a'+4c=14, the oxidation state of V being IV.

A precursor oxide (B) may be prepared by heat-treating a mixture of precursors in powder form, The precursors may be mixed either by a chemical process at low temperature (for example by dissolution/precipitation), or by mechanical grinding (for example in a bead mill), so as to give a mixture of precursors on the atomic scale. The heat treatment may be carried out, for example, at a temperature of between 700° and 1000° C., for a time of 20 to 40 hours. Determining the conditions appropriate for a particular precursor oxide (B) is within the scope of the skilled person. The amounts of the precursors are selected according to the stoichiometry of the desired precursor oxide (B). For example, an oxide (B) in which c'=0 may be obtained by grinding the appropriate amounts of $TiO_2$ and $Na_2CO_3$. To obtain a precursor oxide (B) in which c'≠0, a precursor of M is added to the $TiO_2$ and $Na_2CO_3$ mixture; for example, $V_2O_5$ if M is V, or $Nb_2O_5$ if M is Nb.

It is particularly advantageous to prepare said active material NxTMO on a support which will be used as a current collector for the electrode. In this embodiment, the method for preparing the active material comprises the following steps:
applying the precursor oxide (B) to a current collector, to form a working electrode;
producing a counter-electrode comprising a material capable of liberating $Na^+$ ions;
assembling the electrode and the counter-electrode to form an electrochemical cell in which the electrolyte is a solution of a sodium salt;
applying a reducing current to the working electrode.

The material applied to the current collector of the working electrode comprises the precursor oxide (B), optionally an electron conduction agent and/or optionally a binder.

The presence of the electron conduction agent is preferred, since it permits better use of the electrode.

In the absence of binder, the material of the working electrode is prepared from a precursor oxide (B) powder, preferably in the form of a mixture with an electron conduction agent powder. The precursor oxide (B) powder or the mixture of powders is compacted and applied to a current collector, preferably with a thickness of 100 to 300 μm.

The composition used for producing a working electrode without binder preferably comprises:
at least 60% by weight of precursor oxide (B);
from 0% to 40% by weight of electron conductivity agent.

When the material of the working electrode comprises a polymeric binder, it is advantageous to prepare a composition comprising the oxide (B), the binder, a volatile solvent, and optionally an ion conduction agent, to apply said composition to a current collector, and to remove the volatile solvent by drying. The volatile solvent may be selected, for example, from acetone, tetrahydrofuran, diethyl ether, hexane, and N-methylpyrrolidone.

The composition used for producing a working electrode with a binder preferably comprises:
at least 50% by weight of precursor oxide (B);
from 0% to 25% by weight of electron conductivity agent;
from 0% to 25% by weight of polymeric binder;
from 0% to 30% by weight of solvent.

It is advantageous to prepare a film of material for the working electrode by applying the composition to a glass support, removing the film formed after drying, and applying said film to a current collector.

The current collector of the working electrode is composed of a conductive material, more particularly of a metallic material which may be selected, for example, from copper, aluminium, a steel, and iron.

When the working electrode used for producing the active material NxTMO carries a material comprising the precursor oxide (B), a binder and/or an electron conduction agent, the active electrode material according to the invention is obtained in the form of a composite material, comprising the active material NxTMO, a binder and/or an electron conduction agent.

The electrolyte of the electrochemical cell used for producing the active material NxTMO is a solution of a sodium salt in a solvent. The solvent may be a liquid solvent, optionally gelled by a polymer, or a polar polymeric solvent which is optionally plastified by a liquid.

The liquid solvent is preferably a polar aprotic liquid organic solvent selected, for example, from linear ethers and cyclic ethers, esters, nitriles, nitro derivatives, amides, sulphones, sulpholanes, alkylsulphamides and partially hydrogenated hydrocarbons, The particularly preferred solvents are diethyl ether, dimethoxyethane, glyme, tetrahydrofuran, dioxane, dimethyltetrahydrofuran, methyl or ethyl formate, propylene or ethylene carbonate, alkyl carbonates (in particular, dimethyl carbonate, diethyl carbonate and methyl propyl carbonate), butyrolactones, acetonitrile, benzonitrile, nitromethane, nitrobenzene, dimethylformamide, diethylformamide, N-methylpyrrolidone, dimethyl sulphone, tetramethylene sulphone, tetramethylene sulphone and tetraalkyl-sulphonamides having from 5 to 10 carbon atoms.

The polar polymeric solvent may be selected from crosslinked or non crosslinked solvating polymers which do or do not carry grafted ionic groups. A solvating polymer is a polymer which comprises solvating units containing at least one heteroatom selected from sulphur, oxygen, nitrogen and fluorine. Examples of solvating polymers include linear, comb or block polyethers which do or do not form a network, based on poly(ethylene oxide), or copolymers containing the ethylene oxide or propylene oxide or allyl glycidyl ether unit, polyphosphazenes, crosslinked networks based on polyethylene glycol crosslinked by isocyanates, or the networks obtained by polycondensation and carrying moieties which allow the incorporation of crosslinkable moieties. Also included are block copolymers in which some blocks carry functions which have redox properties, Of course, the list above is not limitative, and all polymers having solvating properties may be used.

The solvent of the electrolyte may comprise simultaneously an aprotic liquid solvent selected from the aprotic liquid solvents stated above, and a polar polymeric solvent comprising units containing at least one heteroatom selected from sulphur, nitrogen, oxygen and fluorine. As an example of a polar polymer of this kind, mention may be made of the polymers containing primarily units derived from acrylonitrile, from vinylidene fluoride, from N-vinyipyrrolidone or from methyl methacrylate, The proportion of aprotic liquid in the solvent may vary from 2% (corresponding to a plastified solvent) to 98% (corresponding to a gelled solvent).

The sodium salt is selected from the sodium salts of strong acids, such as, for example. $NaClO_4$, $NaBF_4$, $NaPF_6$, and sodium salts having a perfluoroalkanesulphonate anion, bis (perfluoroalkylsulphonypimides, bis(perfluoroalkylsulphonyl)methane or tris(perfluoroalkylsulphonyl)methane, $NaClO_4$, $NaPF_6$ and NaFSI are particularly preferred.

The use of a liquid electrolyte for the production of the electrode material NxTMO in situ is particularly preferred.

In a 1st embodiment of the method for producing the active electrode is material according to the invention, the working electrode carrying the precursor oxide (B) forms the cathode, and the counter-electrode is a sodium electrode which functions as anode, The cathode material is enriched in sodium at the end of the 1st discharge of the electrochemical cell, performed by application of a reducing current. The insertion of $Na^+$ ions begins at 0.5 V ($Na^+/Na^0$) and is complete at 0.05 V. Complete discharge corresponds to the insertion of 3 $Na^+$ ions into the compound NMTO.

In a 2nd embodiment, the working electrode carrying the precursor oxide (B) forms the anode, and the counter-electrode operates as the cathode and comprises a material capable of releasing $Na^+$ ions at a potential greater than that of the precursor oxide (B), for example $Na_{0.44}MnO_2$. The anode material is enriched in sodium at the end of the 1st charging of the electrochemical cell. The insertion of $Na^+$ ions begins at 0.5 V ($Na^+/Na^0$) and is complete at 0.05 V. Complete charging corresponds to the insertion of 3 $Na^+$ ions into the precursor oxide (B). The material of the counter-electrode may be selected from compounds conforming to the formula $Na_yMnO_2$, $0.4 \leq y \leq 1$ (for example $Na_{0.44}MnO_2$ or $Na_{0.7}MnO_2$), $Na_2CoO_2$ ($0.4 \leq z \leq 1$) and $Na_2FePO_4F$.

In these two embodiments, an electrode is obtained which can operate as an anode in a sodium ion battery. If the electrode of the invention is prepared according to the 1st embodiment, the sodium counter-electrode must be replaced by an electrode operating at a potential greater than that of the anode.

In the 2nd embodiment, the electrode carrying the precursor oxide (B) operates from the start as the anode. The electrochemical cell used for producing the negative electrode may operate as a "useful" battery. It is, however, preferable to replace the counter--electrode, after the first cycle, with an electrode comprising a sodium-rich sodium ion insertion material, in order not to limit the capacity of the battery from the start.

During implementation of the method of the invention, the application of a reducing current to the precursor oxide (B) present in the working electrode causes the insertion of sodium ions into said material, and the modification of the oxidation state of the elements T and M that is present.

For example, if the precursor oxide (B) is $Na_2Ti_3O_7$, Ti is initially in the oxidation state IV. The application of a reducing current causes the insertion of $Na^+$ ions and the conversion of Ti(IV) to T(III) in the proportion required to maintain the electronic neutrality of the oxide. The active negative electrode material obtained conforms to the formula $Na_xTi(IV)_aTi(III)_bO_7$. If x=5, the active material NxTMO conforms to the formula $Na_5Ti(III)_3O_7$.

When the precursor oxide (B) comprises Nb, it is preferable for the sodium content x' to be less than 2. The application of a reducing current causes the insertion of $Na^+$ ions, and the accompanying reduction of Ti(IV) to Ti(III), then the reduction of Nb(V) to Nb(IV). When reduction is complete, the compound NxTM0 conforms to the formula $Na_xTi(III)_bNb_cO_7$. For example, for b=1 and c=2, x is 3; for b=2 and c=1, x is 4. For b=2.5 and c=0.5, x is 4.5.

When the precursor oxide (B) comprises V, the application of a reducing current causes the insertion of Na ions, and the conversion of Ti(IV) to Ti(III) and of V(IV) to V(III). When reduction is complete, x=5, and the compound NxTMO corresponds to the formula $Na_5Ti(III)_{3-c}V_cO_7$.

A battery according to the invention comprises at least one cell composed of a negative electrode and a positive electrode, which are separated by an electrolyte.

The negative electrode of a battery according to the invention comprises an electrode material containing NxTMO, optionally an ion conduction agent, and/or optionally a binder. The electrode material is carried by a current collector, which may be composed of a conductive material, more particularly of a metallic material which may be selected, for example, from copper, aluminium, a steel, and iron. One advantage of the negative electrode according to the invention, which operates by reversible insertion of sodium ions, is that the collector may be composed of aluminium, because sodium does not form an alloy with aluminium, unlike lithium.

A negative electrode material according to the invention preferably comprises:
  at least 60% by weight of NxTMO;
  from 0% to 30% by weight of electron conductivity agent,
  from 0% to 30% by weight of polymeric binder.

The positive electrode of a battery according to the invention comprises a material capable of reversible insertion of $Na^+$ ions at a potential greater than the operating potential of the negative electrode; optionally an ion conduction agent, and optionally a binder. The material is carried by a current collector which may be composed of a conductive material, more particularly of a metallic material which may be selected, for example, from aluminium, a steel, and iron. An example of active positive electrode material is $Na_yM'O_2$, with $0.4 < y < 1$, and M' being Mn or Co (for example, $Na_{0.44}MnO_2$ or $Na_{0.7}MnO_2$). Mention may also be made of $Na_2FePO_4F$, $Na_2CoPO_4F$, $NaFeSO_4F$, $NaCoSO_4F$, NaNiSO$_4$F and their solid solutions Na(Z$_{1-b}$Mn$_b$)SO$_4$F in which Z is Fe, Co or Ni and b≤0.2.

In a battery according to the invention in which the active material of the negative electrode is NxTMO, the electrolyte may be selected from those stated above for the electrochemical cell in which the oxide NxTMO is prepared, in one particular embodiment, each of the electrodes of a battery according to the invention is composed of a thin film. When the electrolyte is a solid polymeric electrolyte, it is also in the form of a thin film. When the electrolyte is a liquid electrolyte, said liquid impregnates a separator in the form of a thin film. By "thin film" is meant a film having a thickness of the order of 100 to 300 μm. A battery according to the invention may be composed of a single electrochemical cell comprising two electrodes separated by an electrolyte; of a plurality of cells assembled in series; of a plurality of cells assembled in parallel; or of a combination of the two assembly types.

The present invention is described in more detail by the working examples below, which do not, however, impose any limitation on the invention.

The precursor oxide Na$_2$Ti$_3$O$_7$ used in the various examples was prepared by a process described in particular in K. Chiba, et at, cited above. A mixture was formed from 0.3274 g of Na$_2$CO$_3$ and 0.6726 g of anatase TiO$_2$ in a bead mill for 1 hour, and then the mixture was heat-treated at 800° C. for 40 hours, with intermediate grinding being carried out after 20 hours. The X-ray diffraction diagram of the resulting product is shown in FIG. 1. The intensity I (in arbitrary units) is given as a function of the diffraction angle 2θ (in degrees), relative to the Kα line of copper. The diagram confirms the structure and the lattice parameters published by Andersson and Wadsley [Acta Cryst. 14(12) (1961) 1245], namely:

monoclinic structure, space group P1 21/m 1;
lattice parameters a=8.57 Å, b=3.80 Å, c=9.13 Å, B=101.6°.

The cathode material Na$_{0.44}$MnO$_2$ was prepared by the process described by Sauvage et al., Inorg. Chem. 46(8) (2007) 32891. A mixture was formed from 1.184 g of MnCO$_3$ and 0.207 g of Na$_2$CO$_3$ in a bead mill for 30 minutes, after which the mixture was subjected to heat treatment at 300° C. for 8 hours, then at 800° C. for 10 hours, with intermediate grinding being carried out after 5 hours.

DETAILED DESCRIPTION AND EXAMPLES

Example 1

Preparation of Na$_x$Ti$_3$O$_7$, Sodium Counter-electrode/ NaClO$_4$/Powder

In a bead mill, 0.3 g of Na$_2$Ti$_3$O$_7$ and 0.1 g of carbon black were mixed for 30 minutes, and the mixture was then applied to a copper foil to give an electrode. The resultant electrode was mounted in an electrochemical cell in which the counter-electrode is composed of sodium metal and the electrolyte is a 1 M solution of NaClO$_4$ in propylene carbonate. The cell was sealed and then a reducing current corresponding to a rate of C/25 was applied to it.

The insertion of Na$^+$ ions into the oxide Na$_2$Ti$_3$O$_7$ was observed to begin at approximately 0.5 V vs. Na$^+$/Na$^0$, when the carbon had reacted with Na$^+$ ions at higher potentials. The formation of Na$_5$Ti$_3$O$_7$ is complete at approximately 0.05 V vs. Na$^+$/Na$^0$.

The direction of the current applied to the electrochemical cell was then reversed, to cause the disinsertion of Na$^+$ ions inserted under the effect of the reducing current.

Figure 1:
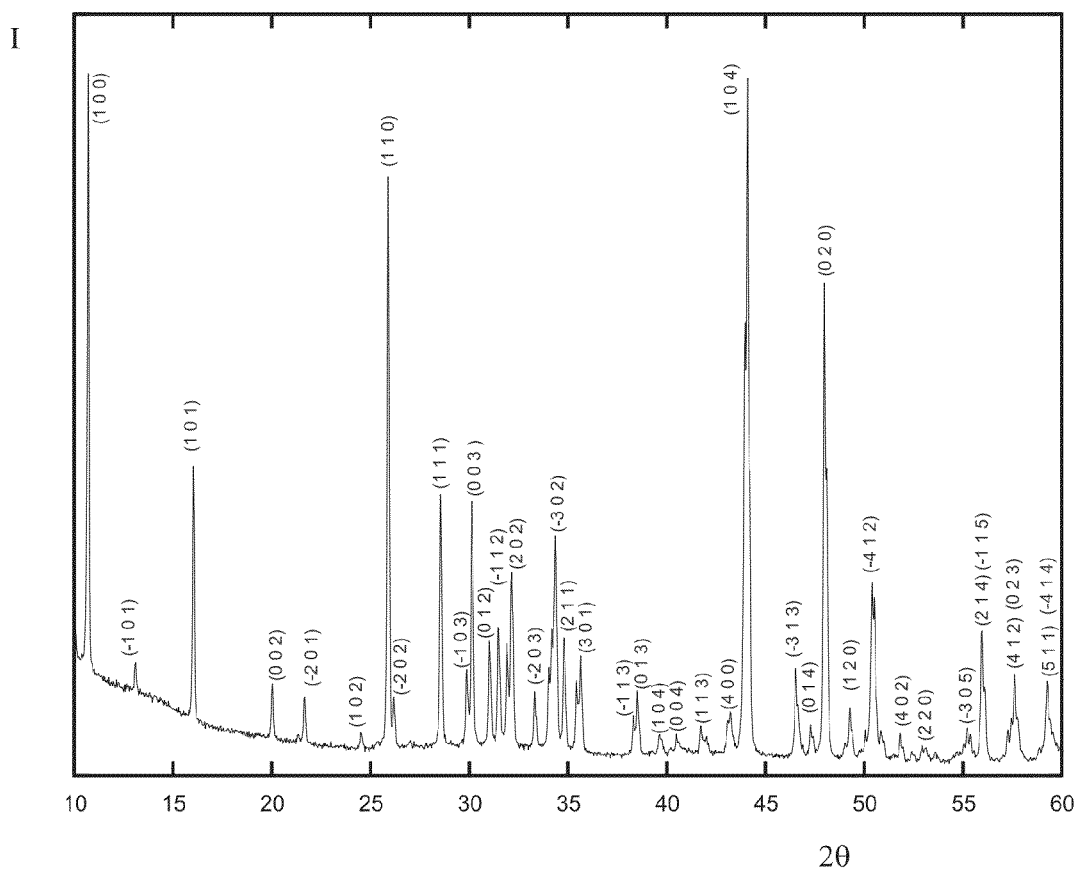
FIG. 1 is an X-ray diffraction diagram of a precursor oxide Na$_2$Ti$_2$O$_7$ used in the various examples.
Figure 2:
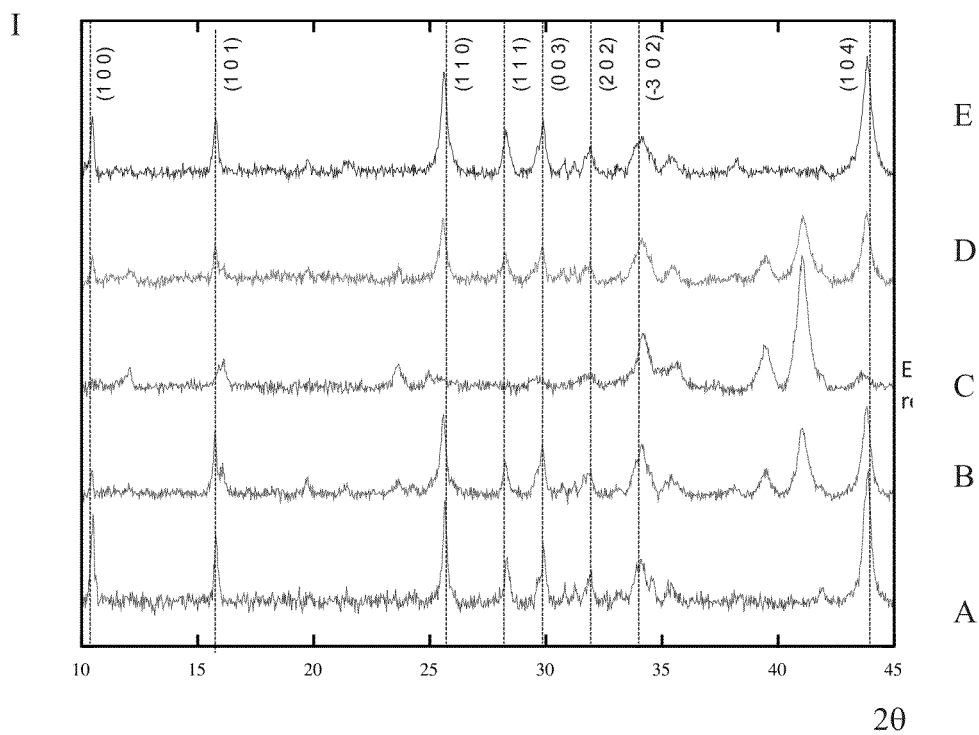
FIG. 2 is an X-ray diffraction diagram of the material formed on the working electrode during the 1st charging/discharge cycle in example 1.

The material formed on the working electrode during the 1st charging/discharge cycle was subjected to X-ray diffraction, at various stages in the charging/discharge cycle. The resulting diagrams are shown in FIG. 2. The intensity I (in arbitrary units) is given as a function of the diffraction angle 2θ in degrees, relative to the Kα line of copper. In FIG. 2, the curves identified by A, B, C, D and E represent the X-ray diffraction diagram for, respectively, the initial Na$_2$Ti$_3$O compound, the compound Na$_{2+x}$Ti$_3$O$_7$ with an intermediate insertion rate x of Na$^+$ ions inserted, the compound Na$_{2+x}$Ti$_3$O$_7$ with the maximum degree of insertion, the compound Na$_{2+x}$Ti$_3$O$_7$ after partial disinsertion of Na$^+$ and the compound Na$_2$Ti$_3$O close to its initial state. These curves demonstrate the perfectly reversible nature of the insertion of Na$^+$ into the compound Na$_2$Ti$_3$O$_7$. Reversal of the current causes reoxidation of the compound to Na$_2$Ti$_3$O$_7$.

Figure 3:
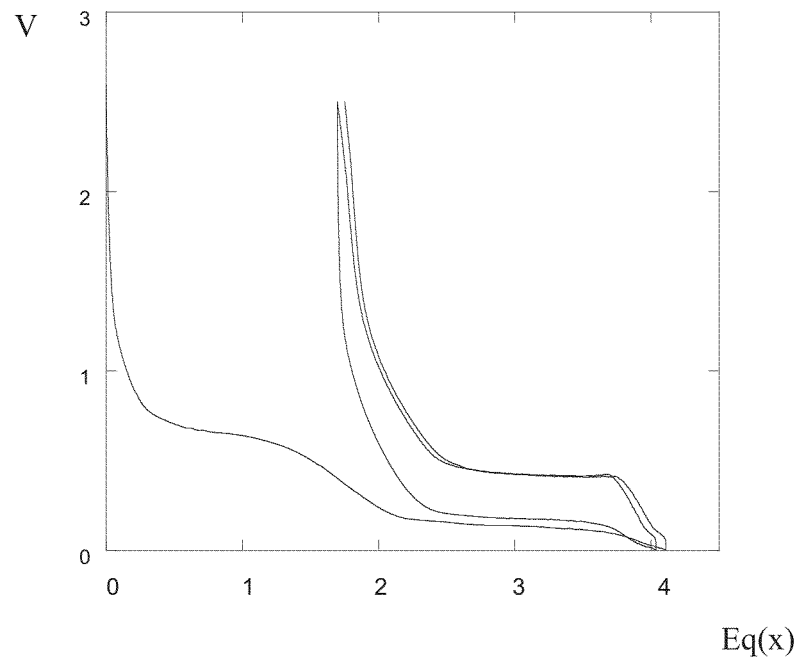
FIG. 3 is a graph of the variation in potential V as a function of the equivalent of the number x of Na$^+$ ions inserted during the first two charging/discharge cycles in example 1.
Figure 4:
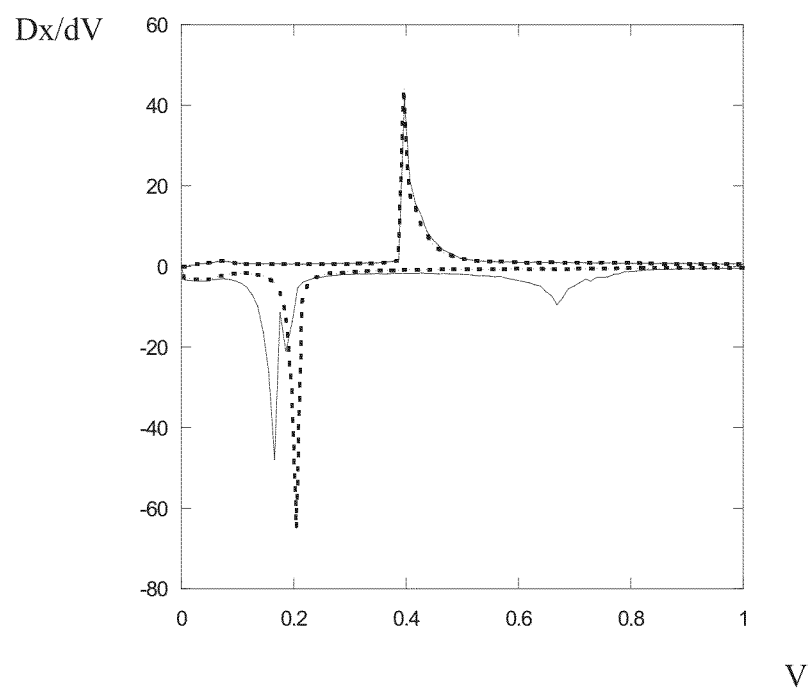
FIG. 4 is corresponding derivative dx/dV of FIG. 3 as a function of the potential V in volts.

FIG. 3 shows the variation in potential V (in volts vs. Na$^+$/Na) as a function of the equivalent of the number x of Na$^+$ ions inserted [Eq(x)] during the first two charging/discharge cycles, and FIG. 4 shows the corresponding derivative dx/dV as a function of the potential V in volts. FIG. 3 demonstrates an irreversible phenomenon during the 1st cycle, This phenomenon corresponds to the reaction of the carbon added to the electrode material as an electron conductivity agent.

When the composite Na$_2$Ti$_3$O$_7$+ carbon material of the working electrode is subjected to a reducing current during the first discharge, it reacts with 5 sodium. in a first stage, 2 sodium ions react irreversibly with the carbon (in particular by surface absorption). Subsequently, sodium ions are inserted into the Ti $_3$O$_7$ structure. The insertion of each sodium ion causes the reduction of a Ti(IV) atom to Ti(III). It is therefore possible to insert 3 sodium ions at most into the compound Na$_2$Ti$_3$O$_7$.

This fact was confirmed by an experiment conducted under the same conditions, using a cell in which the material of the working electrode contains solely carbon. FIG. 4 shows the variation in potential as a function of the equivalent, of Na$^+$ ions consumed by application of a reducing current to an electrochemical cell which differs from that described above only in that the working electrode does not contain the oxide Na$_2$Ti$_3$O$_7$.

Figure 5:
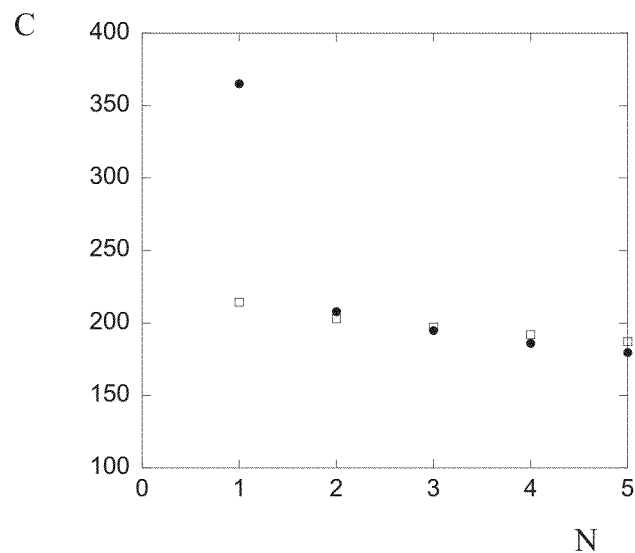
FIG. 5 is a profile of the capacity C as a function of the number of cycles N, for the electrochemical cell of example 1.

FIG. 5 shows the profile of the capacity C (in mAh/g) as a function. of the number of cycles N, for the electrochemical cell of the present example, cycled at a rate of C/25. For a given cycle, the charging capacity is represented by □, and the discharge capacity is represented by ●. This figure shows that the capacity is stable at approximately 175 mAh/g in the 5th cycle, both on charging and on discharge.

Example 2

Preparation of Na$_{2+x}$Ti$_3$O$_7$, Sodium Counter-electrode/NaFSI/Powder

The procedure of Example 1 was reproduced, but replacing the bead mill with a mortar and using the salt NaFSI in the electrolyte instead of NaClO$_4$.

Figure 6:
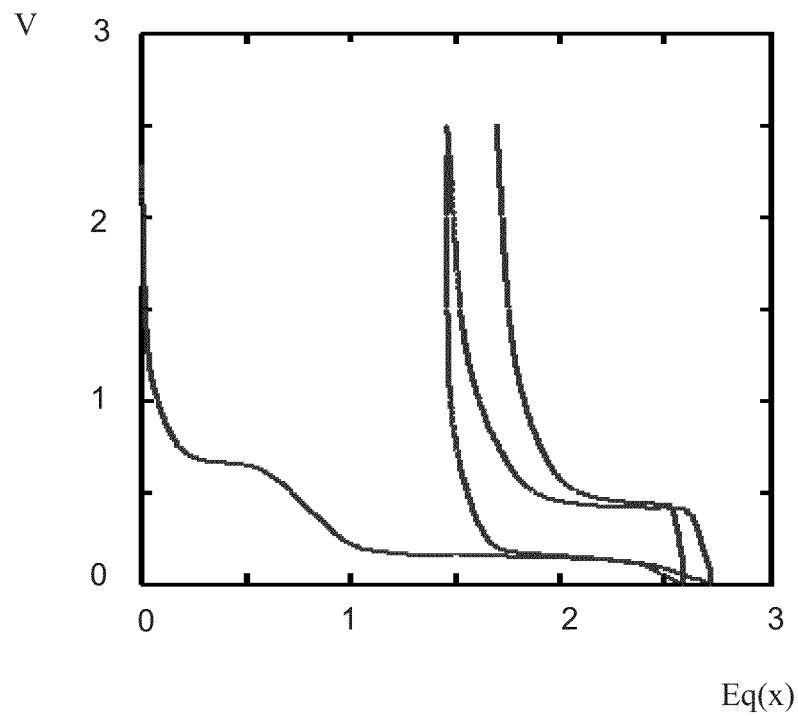
FIG. 6 is a graph of the variation in potential V as a function of the equivalent of the number x of Na$^+$ ions inserted during the first two charging/discharge cycles of example 2.

FIG. 6 shows the variation in potential V (in volts vs. Na$^+$/Na) as a function of the equivalent of the number x of Na$^+$ ions inserted [Eq(x)] during the first two charging/discharge cycles. The capacity obtained is lower than that in the preceding example, probably because the mixture was prepared under conditions less prone to ensuring mixing at the atomic scale.

Example 3

Preparation of Na$_{2+x}$Ti$_3$O$_7$, Sodium Counter-electrode/NaClO$_4$/Binder

An electrode was prepared from a mixture of 0.355 g of Na$_2$Ti$_3$O$_7$, 0.04 g of carbon black, 0.105 g of PVDF and 0.01 g of dihutyl phthalate (as plasticizer). This mixture was ground in a mortar, and then 10 ml of acetone were added. The resultant paste was stirred overnight and then coated onto a glass plate. After 15 minutes, the acetone has evaporated and a plastic film is obtained. Said film is immersed in ether to remove the plasticizer, then heated at 80° C. in a glove box under a dry atmosphere to remove the water. The dry film obtained can be used as an electrode.

The resultant plastic electrode was mounted in an electrochemical cell in which the counter-electrode is composed of sodium metal and the electrolyte is a 1 M solution of NaClO$_4$ in propylene carbonate. The cell was sealed and then a reducing current was applied to the working electrode, corresponding to a rate of C/25.

Figure 7:
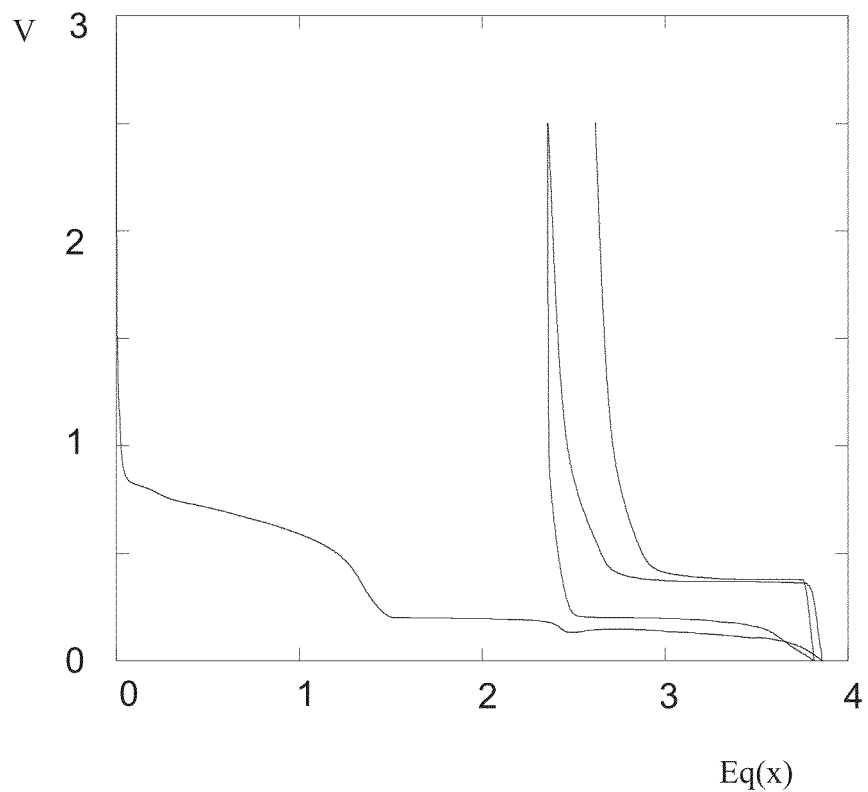
FIG. 7 is a. graph of the variation in potential V as a function of the equivalent of the number x of Na$^+$ ions inserted during the first two charging/discharge cycles of example 3.

FIG. 7 shows the variation in potential V (in volts vs. Na$^+$/Na) as a function of the equivalent of the number x of Na$^+$ ions inserted [Eq(x)] during the first two charging/discharge cycles.

Example 4

Use of Na$_{2+x}$Ti$_3$O$_7$, as Negative, with an Na$_{0.44}$MnO$_2$ Positive/Binder An electrode containing Na$_x$Ti$_3$O$_7$ was prepared according to the procedure of Example 3. An electrode was prepared from a mixture of 0.71 g of Na$_{0.44}$MnO$_2$, 0.08 g of carbon black, 0.210 g of PVDF and 0.02 g of dibutyi phthalate (as plasticizer). This mixture was ground in a mortar, and then 20 ml of acetone were added. The resultant paste was stirred overnight and then coated onto a glass plate. After a treatment similar to that of Example 3, a plastic electrode is obtained.

An electrochemical cell was produced by assembling the two electrodes and using as electrolyte a 1 M solution of NaClO$_4$ in propylene carbonate. The cell was sealed and then subjected to cycling by applying a current corresponding to a rate of C/25.

Figure 8:
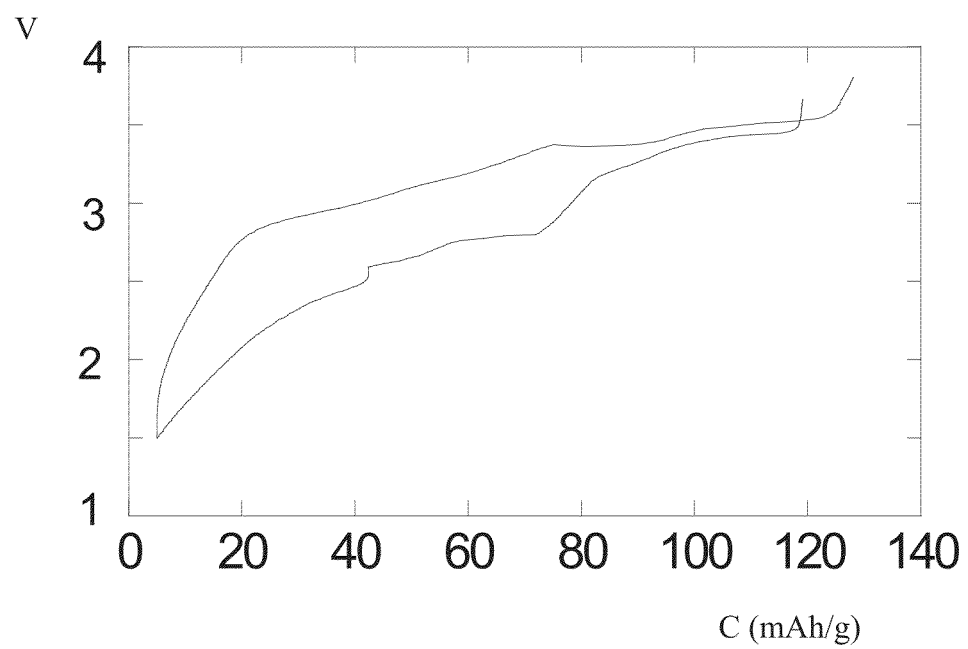
FIG. 8 is a graph of the relation between the capacity C of the cell and the voltage V for example 4.
Figure 9:
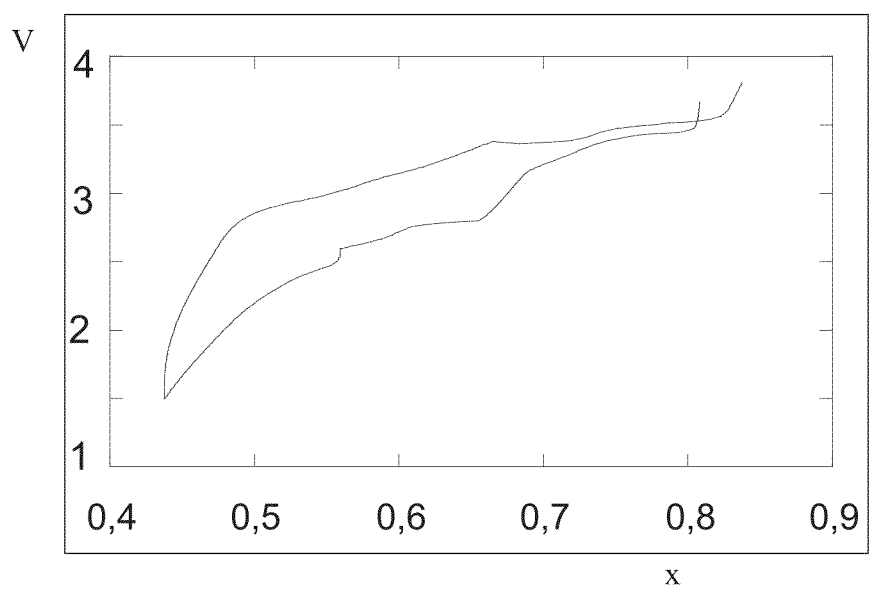
FIG. 9 is a. graph of the relation between the sodium content x of the positive electrode and the voltage V in example 4.

For the second cycle, FIG. 8 shows the relation between the capacity C (in mAh/g) of the cell and the voltage V (in volts vs. Na$^+$/Na), and FIG. 9 shows the relation between the sodium content x of the positive electrode and the voltage V.

The invention claimed is:

1. Active electrode material composed of an oxide of Na and Ti with a structure corresponding to the layered structure of the compound Na$_2$Ti$_3$O$_7$, said oxide conforming to the formula Na$_x$Ti(IV)$_a$Ti(III)$_b$M$_c$O$_7$ (A), in which:

x denotes the number of Na$^+$ ions inserted between the layers, per Ti$_3$O$_7$ structural unit, with 0<x≤5;

Ti(IV) and Ti(III) represent titanium in the oxidation states IV and III, respectively;

M represents one or more elements selected from 3d transition metals and 4d transition metals;

the values of x, a, b and c are such that the compound is electronically neutral in view of the oxidation state of the element or elements represented by M; and the ratio (a+b)/c is greater than 0.5.

2. Active material according to claim 1, wherein the oxide (A) conforms to one of the following formulae:

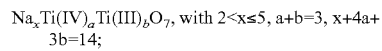

Na$_x$Ti(IV)$_a$Ti(III)$_b$O$_7$, with 2<x≤5, a+b=3, x+4a+3b=14;

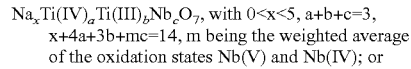

Na$_x$Ti(IV)$_a$Ti(III)$_b$Nb$_c$O$_7$, with 0<x<5, a+b+c=3, x+4a+3b+mc=14, m being the weighted average of the oxidation states Nb(V) and Nb(IV); or

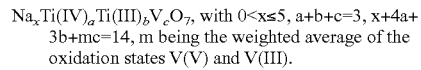

Na$_x$Ti(IV)$_a$Ti(III)$_b$V$_c$O$_7$, with 0<x≤5, a+b+c=3, x+4a+3b+mc=14, m being the weighted average of the oxidation states V(V) and V(III).

3. Electrode composed of a current collector which carries an electrode material, wherein the electrode material comprises an active electrode material according to claim 1.

4. Electrode according to claim 3, wherein the electrode material further comprises an electron conductivity agent, polymeric binder or both.

5. Electrode according to claim 4, wherein the electrode material comprises:

at least 60% by weight of active material;

from 0% to 30% by weight of electron conductivity agent; and from 0% to 30% by weight of polymeric binder.

6. Electrode according to claim 4, wherein the electrode material comprises a polymeric binder, and it is in the form of a film carried by a current collector.

7. Electrode according to claim 4, wherein the electrode material is in the form of a compacted powder layer carried by a current collector.

8. Method for producing an electrode having a material of formula Na$_x$Ti(IV)$_a$Ti(III)$_b$M$_c$O$_7$ (A) according to claim 3, wherein said method employs a precursor oxide conforming to the formula Na$_{x'}$Ti(IV)$_a$M$_c$O$_7$ (B), in which:

x' denotes the number of Na$^+$ ions inserted between the layers, per Ti$_3$O$_7$ structural unit, with 0<x≤2;

Ti(IV) represents titanium in the oxidation state IV;

M represents one or more elements selected from 3d transition metals and 4d transition metals;

$a' = a+b$;

the values of $x'$, $a'$, and $c$ are such that the compound is electronically neutral in view of the oxidation state of the element or elements represented by M;

the ratio $a'/c$ is greater than 0.5;

said method comprising the following steps:

applying the precursor oxide (B) to a current collector, to form a working electrode;

producing a counter-electrode comprising a material capable of liberating $Na^+$ ions;

assembling the electrode and the counter-electrode to form an electrochemical cell in which the electrolyte is a solution of a sodium salt;

applying a reducing current to the working electrode.

9. Method according to claim 8, wherein the material applied to the current collector of the working electrode comprises an electron conduction agent a binder or both.

10. Method according to claim 9, wherein the material applied to the current collector of the working electrode comprises:

at least 60% by weight of precursor oxide (B);

from 0% to 40% by weight of electron conductivity agent.

11. Method according to claim 9, wherein a material applied to the current collector of the working electrode comprises the oxide B, a volatile solvent, and at least one of the binder or the ion conduction agent; the volatile solvent being removed by drying.

12. Method according to claim 9, wherein the material applied to the current collector of the working electrode comprises:

at least 50% by weight of precursor oxide (B);

from 0% to 25% by weight of electron conductivity agent;

from 0% to 25% by weight of polymeric binder;

from 0% to 30% by weight of volatile solvent.

13. Method according to claim 8, wherein the electrolyte is a solution of a sodium salt in a liquid solvent.

14. Method according to claim 8, wherein the counter-electrode is a sodium metal electrode or an electrode comprising as active material a material capable of releasing $Na^+$ ions at a potential greater than that of the oxide (B).

15. a battery comprising an anode, a cathode and an electrolyte, wherein the electrolyte is a solution of a sodium salt in a liquid solvent, a gelled liquid solvent or a solid polymeric solvent, wherein the anode is an electrode according to claim 4 and the cathode comprises a material applied to a current collector, said material comprising a compound capable of reversible insertion of sodium ions at a potential greater than that of the anode.

* * * * *